US008051562B2

(12) United States Patent
Sakai et al.

(10) Patent No.: US 8,051,562 B2
(45) Date of Patent: Nov. 8, 2011

(54) METHOD AND APPARATUS FOR MANUFACTURING FUEL PUMP

(75) Inventors: Hiromi Sakai, Nukata-gun (JP); Shinji Ueda, Anjo (JP); Tadashi Hazama, Chita-gun (JP); Eiji Iwanari, Chiryu (JP); Shouya Watanabe, Okazaki (JP)

(73) Assignee: Denso Corporation, Kariya (JP)

( * ) Notice: Subject to any disclaimer, the term of this patent is extended or adjusted under 35 U.S.C. 154(b) by 296 days.

(21) Appl. No.: 11/968,517

(22) Filed: Jan. 2, 2008

(65) Prior Publication Data

US 2008/0172875 A1 Jul. 24, 2008

(30) Foreign Application Priority Data

Jan. 23, 2007 (JP) ................................ 2007-012701
Aug. 28, 2007 (JP) ................................ 2007-220855

(51) Int. Cl.
*B23P 15/00* (2006.01)

(52) U.S. Cl. .................. 29/888.02; 29/888; 29/888.021; 29/509; 29/510; 29/511; 29/515; 415/55.1

(58) Field of Classification Search .................... 29/888, 29/888.02, 509, 510, 511, 513, 515, 888.021; 415/55.1; 219/604; 413/1, 2, 4
See application file for complete search history.

(56) References Cited

U.S. PATENT DOCUMENTS 3,142,886 A * 8/1964 Bronson et al. .............. 29/25.03
3,674,605 A * 7/1972 Baumann ...................... 156/479
4,423,823 A * 1/1984 Franek et al. ................ 220/614
4,844,621 A * 7/1989 Umemura et al. ............ 415/119
5,139,163 A * 8/1992 Diaz .......................... 220/258.2
5,671,522 A * 9/1997 Aronne ........................ 29/419.2
2005/0115050 A1* 6/2005 Ezaka et al. .................... 29/523
2005/0163605 A1 7/2005 Oi

FOREIGN PATENT DOCUMENTS

| | | |
|---|---|---|
| JP | 64-39490 | 3/1989 |
| JP | 1-131880 | 9/1989 |
| JP | 5-5500 | 1/1993 |
| JP | 9-108886 | 4/1997 |
| JP | 2004-283863 | 10/2004 |
| JP | 2005-207320 | 8/2005 |
| JP | 2005-330827 | 12/2005 |
| WO | WO 2005002777 A1 * | 1/2005 |

OTHER PUBLICATIONS

Machine Translation of JP 2005-330827, Feb. 12, 2005.*
Japanese Office Action dated Jan. 9, 2009, issued in corresponding Japanese Application No. 2007-220855, with English translation.
Chinese Office Action dated May 22, 2009, issued in corresponding Chinese Application No. 200810003751.3, with English translation.

* cited by examiner

*Primary Examiner* — David Bryant
*Assistant Examiner* — Ryan J Walters
(74) *Attorney, Agent, or Firm* — Nixon & Vanderhye PC

(57) ABSTRACT

A cover is inserted into a housing of a fuel pump. Then, a housing-side engaging portion of the housing, which is located at a peripheral edge of an opening of the housing, is heated with a heating means. Thereafter, the housing-side engaging portion is swaged by a punch toward the cover to fix the cover to the housing.

6 Claims, 13 Drawing Sheets

METHOD AND APPARATUS FOR MANUFACTURING FUEL PUMP

CROSS REFERENCE TO RELATED APPLICATION

This application is based on and incorporates herein by reference Japanese Patent Application No. 2007=12701 filed on Jan. 23, 2007 and Japanese Patent Application No. 2007-220855 filed on Aug. 28, 2007.

BACKGROUND OF THE INVENTION

1. Field of the Invention

The present invention relates to a method and an apparatus for manufacturing a fuel pump.

2. Description of Related Art

With reference to FIG. 20, a known fuel pump includes a tubular housing 11, an impeller (not shown) and a cover 22. The housing 11 has an opening 11*a* and receives the impeller, and the cover 22 covers the opening 11*a* of the housing 11. The impeller is received in a pump chamber 22*a*, which is formed on one axial side of the cover 22 that is opposite from the opening 11*a* of the housing 11. In a case of the fuel pump recited in Japanese Unexamined Patent Publication 2005-207320 (corresponding to US2005/0163605A1), a housing-side engaging portion 11*y*, which includes a bending portion 11*b* and a cylindrical portion 11*c*, of the housing 11 located along a peripheral edge of the opening 11*a*, is radially inwardly swaged, i.e., is bent against the cover 22, so that the cover 22 is fixed to the housing 11.

A clearance between the cover 22 and the impeller has a large influence on fuel flow characteristics in the fuel pump. Therefore, the manufacturing of the fuel pump is highly controlled to make this clearance to a predetermined clearance.

Specifically, the bending portion 11*b* of the housing-side engaging portion 11*y* may spring back (see an arrow SB in FIG. 20) right after the swaging. Thus, in such a case, the cover 22 may not be insufficiently urged against the housing 11. When the cover 22 is not sufficiently urged against the housing 11, an urging force (hereinafter, referred to as an axial force F1), which limits removal of the cover 22 from the housing 11, may become insufficient. In such a case, the bending portion 11*b* may be deformed away from the cover 22, and the cover 22 may be moved away from the impeller. Therefore, the above described clearance may be increased to deteriorate the fuel flow characteristics in the fuel pump.

In order to address the above disadvantage, the inventors of the present application have worked on a new manufacturing method by, for example, increasing a swaging load, which is applied to the housing-side engaging portion 11*y* of the housing 11, in view of the springing back of the bending portion 11*b* (see a previously proposed product A in FIG. 4). However, when an excess swaging load is applied to the housing-side engaging portion 11*y* and the cover 22, an undesirable deformation occurs in the bending portion 11*b* and the cover 22, so that the above-described clearance is significantly changed. Thus, it is not possible to control the clearance with the high degree of precision, and thereby the deterioration in the fuel flow characteristics in the fuel pump is inevitable.

Also, the inventors of the present invention have tried another method. In this method, recesses 22*b* (see FIG. 20) are formed on a surface of the cover 22. After the swaging of the housing-side engaging portion 11*y* along all around the housing 11, opposed portions of the bending portion 11*b*, which are axially opposed to the recesses 22*b*, are pressed against the recesses 22*b* (see a previously proposed product B shown in FIG. 4). This swaging process can substantially limit the springing back of the bending portion 11*b* described above, so that the sufficient axial force F1 can be exerted by the housing-side engaging portion 11*y*. However, the removal forcer which acts on the cover 22 to remove the cover 22 from the housing 11, is concentrated on the depressed, opposed portions of the bending portion 11*b*, which are opposed to and depressed against the recesses 22*b*. Therefore, the opposed portions are deformed away from the cover 22. As a result, the cover 22 is moved away from the impeller to increase the clearance between the cover 22 and the impeller. Thus, it is not possible to control the clearance with the high degree of precision, and thereby the deterioration in the fuel flow characteristics in the fuel pump is inevitable.

SUMMARY OF THE INVENTION

The present invention addresses the above disadvantages. Therefore, it is an objective of the present invention to provide a manufacturing method and a manufacturing apparatus for an improved fuel pump, in which a sufficient axial force is achieved by a housing-side engaging portion of a housing of the fuel pump to implement an effectively controlled clearance between a cover and an impeller.

To achieve the objective of the present invention, there is provided a method for manufacturing a fuel pump, which includes a tubular housing, an impeller and a cover. The tubular housing has an opening. The impeller is received in the housing. The cover covers the opening of the housing and is placed on one axial side of the impeller where the opening of the tubular housing is located. According to the method, the cover is inserted into the housing. The housing-side engaging portion of the housing, which is located at a peripheral edge of the opening of the housing, is heated. Then, the housing-side engaging portion is swaged toward the cover to fix the cover to the housing.

To achieve the objective of the present invention, there is also provided an apparatus for manufacturing a fuel pump, which includes a tubular housing that has an opening; an impeller that is received in the housing; and a cover that covers the opening of the housing and is placed on one axial side of the impeller where the opening of the tubular housing is located. The apparatus includes a heating means and a punch. The heating means is for heating a housing-side engaging portion of the housing, which is located at a peripheral edge of the opening of the housing. The punch swages the housing-side engaging portion toward the cover, which is inserted into the housing.

BRIEF DESCRIPTION OF THE DRAWINGS

The invention, together with additional objectives, features and advantages thereof, will be best understood from the following description, the appended claims and the accompanying drawings in which:

DETAILED DESCRIPTION OF THE INVENTION

Various embodiments of the present invention will be described with reference to the accompanying drawings.

First Embodiment

A manufacturing method and a manufacturing apparatus for manufacturing a fuel pump according to a first embodiment of the present invention will be described with reference to FIGS. 1A to 10.

Figure 2:
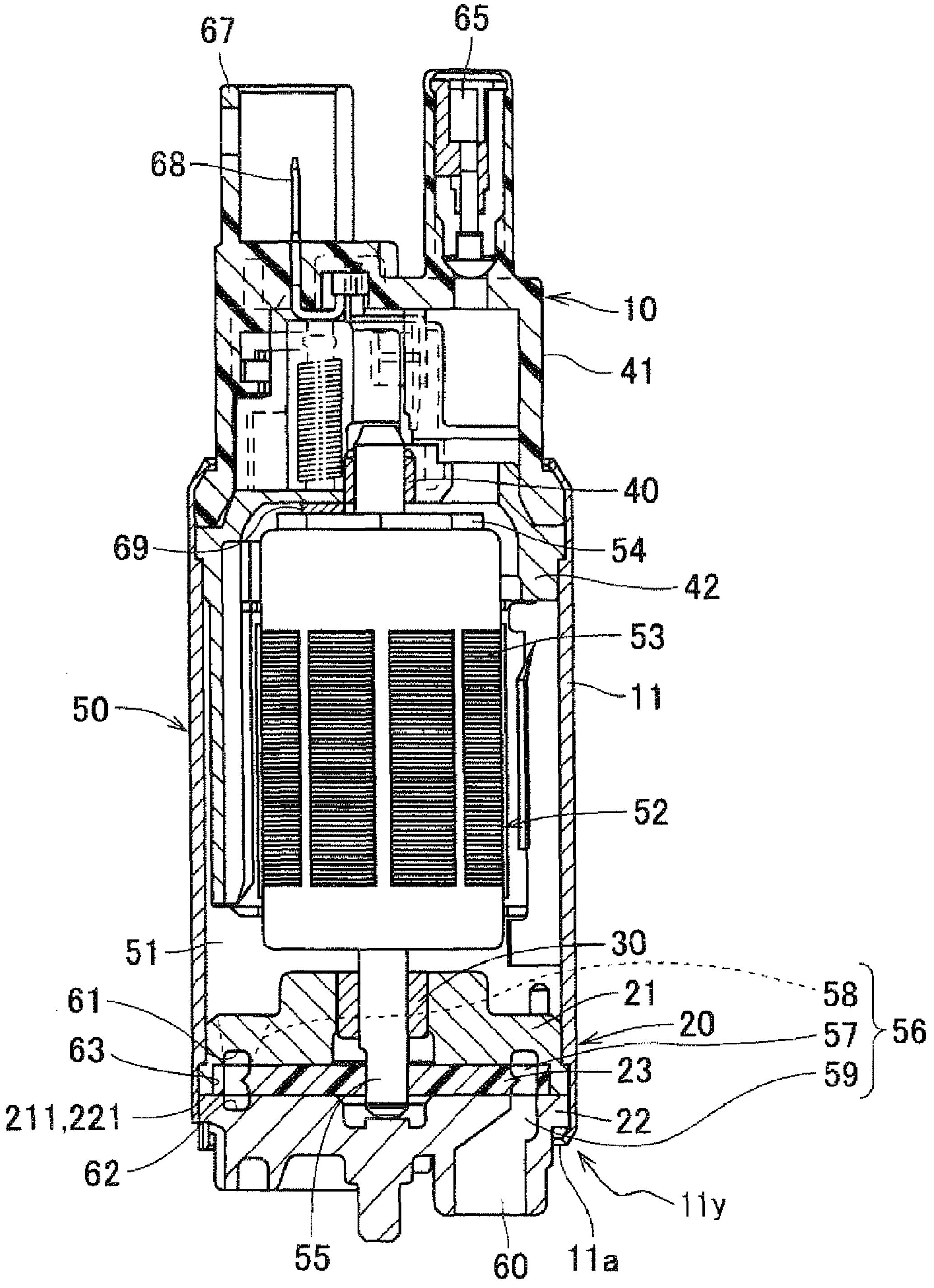
FIG. 2 is a cross sectional view showing a fuel pump manufactured by the fuel pump manufacturing method of the first embodiment.

First, with reference to FIG. 2, an overall structure of a fuel pump 10 will be described. In this instance, the fuel pump 10 is received in a fuel tank of, for example, a two or four wheel vehicle (not shown). The fuel pump 10 draws fuel out of the fuel tank and discharges it toward an engine of the vehicle.

The fuel pump 10 includes a pump arrangement 20 and a motor arrangement 50. The motor arrangement 50 drives the pump arrangement 20. The motor arrangement 50 is formed as a direct current motor. In the motor arrangement 50, permanent magnets are arranged along an inner peripheral surface of a housing 11, and an armature 52 is placed radially inward of the magnets in the housing 11 in coaxial with the magnets.

The pump arrangement 20 includes a casing 21, a cover 22 and an impeller 23. The casing 21 and the cover 22 constitute a flow passage defining member, in which a pump chamber is formed. The impeller 23 is rotatably received in the pump chamber. An end face 211 (hereinafter referred to as a collar surface) of the casing 21 abuts an end surface 221 of the cover 22. The casing 21 and the cover 22 are fixed to an end portion of the housing 11, which is opposite from an end cover 41.

The impeller 23 is made of a resin material and includes blades, which are arranged one after another in a circumferential direction. A groove is formed between each adjacent two of the blades. In the present embodiment, the casing 21 and the cover 22 are made of metal. More specifically, in the present embodiment, the casing 21 and the cover 22 are formed from aluminum thorough die-casting. A bearing member 30 is fitted into a center hole of the casing 21. One axial end portion of a rotatable shaft 55 of the armature 52 is rotatably supported by the bearing member 30. The other axial end portion of the rotatable shaft 55 is rotatably supported by a bearing member 40. The bearing member 40 is, in turn, held in a center hole of a bearing holder 42 that is fixed to the other end portion of the housing 11.

A pump flow passage 56 is formed in the casing 21 and the cover 22 to conduct fuel. The pump flow passage 56 includes a pressurizing flow passage 57, a guide outlet 58 and a guide inlet 59. The pressurizing flow passage 57 is defined by an inner surface of a C-shaped groove 61, an inner surface of a C-shaped groove 62 and the impeller 23. Here, the C-shaped groove 61 is provided in a bottom surface of an annular recess 63 of the casing 21, and the C-shaped groove 62 is provided in the cover 22. The outlet opening 58 is formed in the casing 21 and conducts pressurized fuel, which is pressurized in the pressuring flow passage 57, to the fuel chamber 51.

The armature 52 is rotatably received in the motor arrangement 50, and coils are wound around a core 53 of the armature 52. The coils receive an electric power from an electric power source (not shown) through terminals 68, brushes 69 and a commutator 54. The terminals 68 are embedded in a connector housing 67.

When the armature 52 is rotated upon receiving the electric power, the rotatable shaft 55 of the armature 52 and the impeller 23 are rotated. When the impeller 23 is rotated, fuel is drawn into the pump flow passage 56 through a fuel inlet 60 formed in the cover 22. Then, the fuel drawn into the pump flow passage 56 is pressurized upon the rotation of the impeller 23 and is thereafter discharged from the pump flow passage 56 into the fuel chamber 51. The fuel introduced into the fuel chamber 51 passes around the armature 52 and is then discharged out of the fuel pump 10 through a discharge outlet 65.

Figure 3:
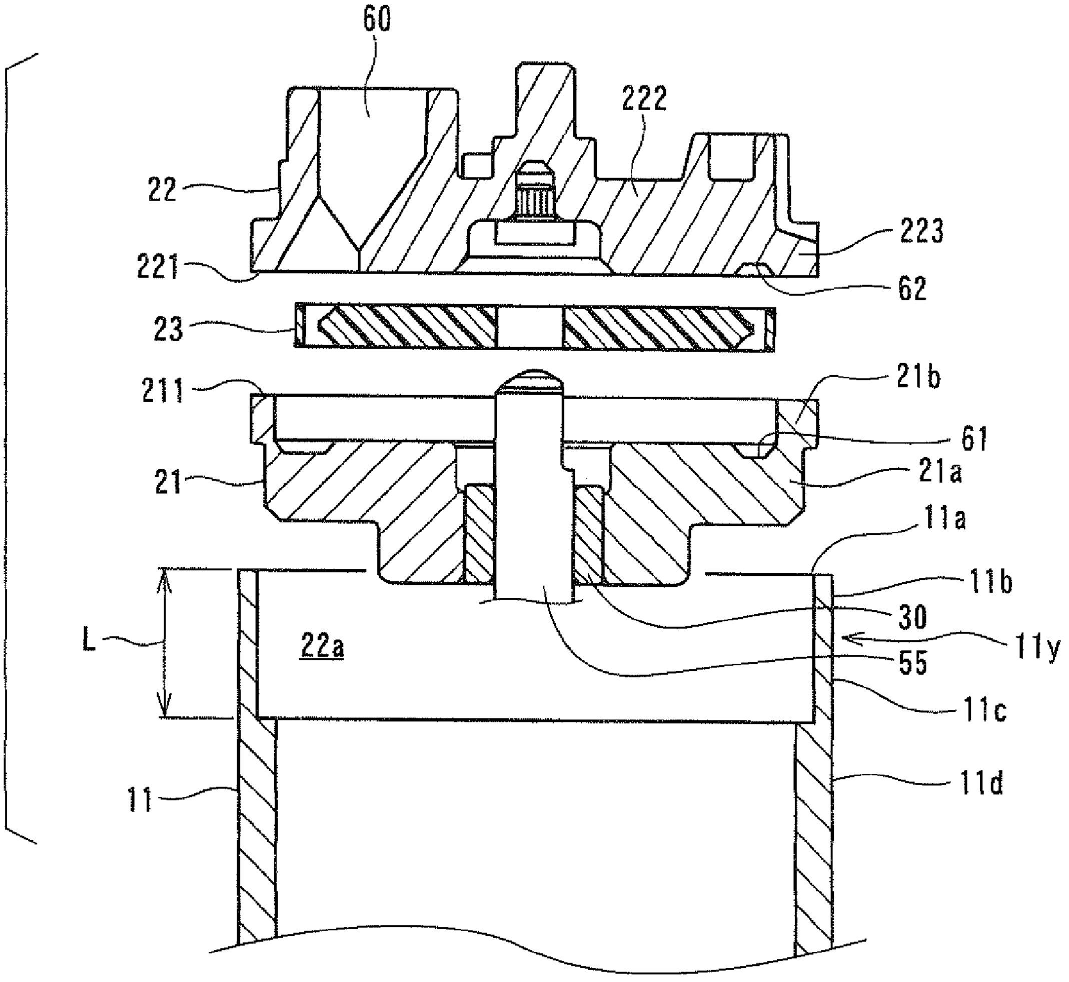
FIG. 3 is a partial exploded view of the fuel pump shown in FIG. 2.
Figure 4:
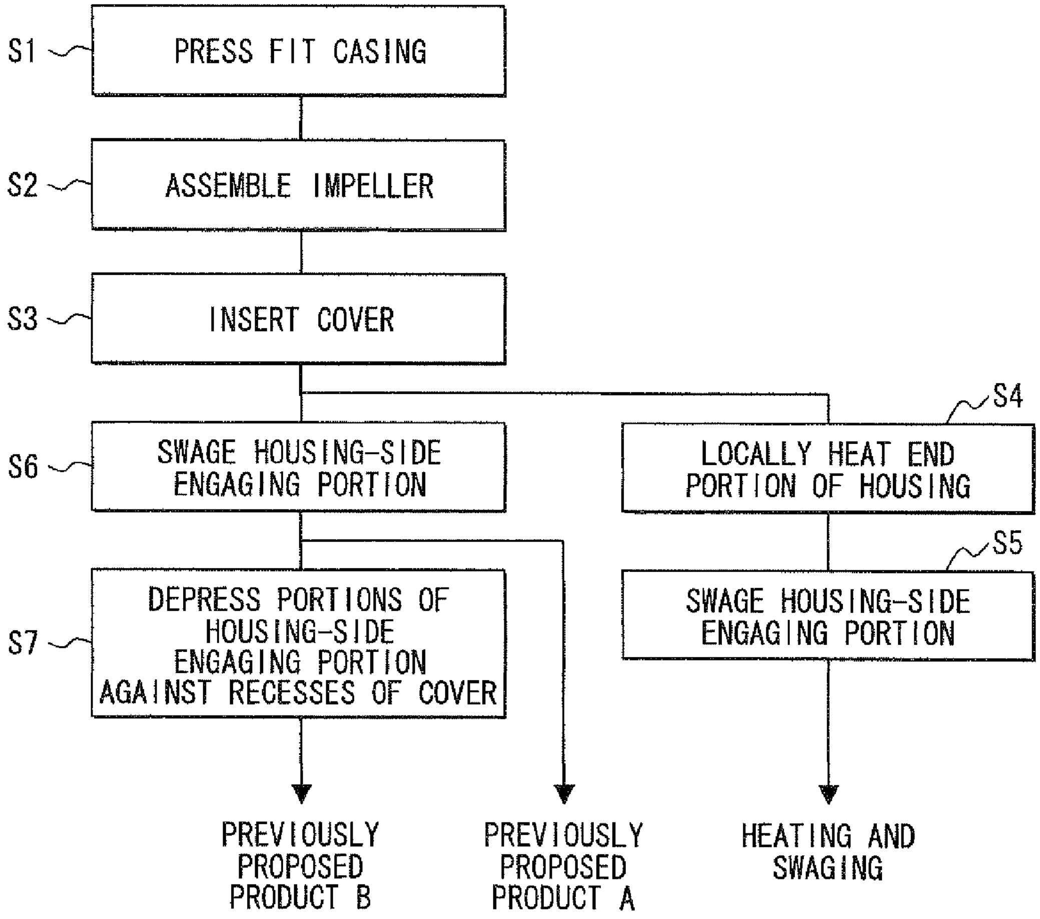
FIG. 4 is a flowchart showing the manufacturing method of the first embodiment.

A detailed structure of the pump arrangement 20, which forms a main feature of the present embodiment, and a manufacturing method of the pump arrangement 20 will be described below. FIG. 3 is an exploded view of the fuel pump 10. In this exploded state, steps S1-S5 (see FIG. 4) described below are performed.

The housing 11 is made of iron-based metal (i.e., iron or an alloy containing iron) and is configured into a tubular shape. The housing 11 includes a large diameter cylindrical portion 11*c* and a small diameter cylindrical portion 11*d*, which are coaxially arranged. The large diameter cylindrical portion 11*c* receives the casing 21. The small diameter cylindrical portion 11*d* has an inner diameter that is smaller than an inner diameter of the large diameter cylindrical portion 11*c*. An outer diameter of the housing 11 is constant throughout the large diameter cylindrical portion 11*c* and the small diameter cylindrical portion 11*d*. Thus, a wall thickness of the large diameter cylindrical portion 11*c* is smaller than a wall thickness of the small diameter cylindrical portion 11*d*.

The casing 21 is made of aluminum and is inserted into the housing 11 through an opening 11*a* of the housing 11. The casing 21 also includes a press fit portion 21*a* and a cylindrical receiving portion 21*b*, which are formed integrally through the die-casting.

The cylindrical receiving portion 21*b* has a cylindrical shape and is placed inside the large diameter cylindrical portion 11*c* of the housing 11. An inner peripheral surface of the cylindrical receiving portion 21*b* is radially opposed to an outer peripheral surface of the impeller 23. The press fitting portion 21*a* is formed into a cylindrical shape and is press fitted to an inner peripheral surface of the small diameter cylindrical portion 11*d*. At the time of press fitting, a jig is used to axially press the collar surface 211 of the cylindrical receiving portion 21*b* toward the small diameter cylindrical portion 11*d* (step St referred to as a casing press fitting step).

A space, which is surrounded by the casing 21 and the cover 22, i.e., an interior space of the large diameter cylindrical portion 11*c* forms a pump chamber 22*a* (FIG. 3). After step S1 (the casing press fitting step), the impeller 23 is inserted into the pump chamber 22*a* through the opening 11*a* of the housing 11, and the impeller 23 is assembled to the rotatable shaft 55 (step S2 referred to as impeller assembling step).

The cover 22 includes a cover-side engaging portion 223 and a main body 222. The cover-side engaging portion 223 and the main body 222 are formed integrally from aluminum by the die-casting. The cover-side engaging portion 223 is formed as an annular body, which radially outwardly extends from the main body 222 and covers the opening 11*a*. After step S2 (the impeller assembling step), the cover 22 is inserted through the opening 11*a* of the housing 11 to place the cover-side engaging portion 223 into the large diameter cylindrical portion 11*c* of the housing 11 (step S3 referred to as a cover inserting step).

In this instance, a portion of the housing it, which is located along a peripheral edge of the opening 11*a* and axially extends to a location adjacent to the large diameter cylindrical portion 11*c* and is bent at step S5 (referred to as a swaging step), is called as a bending portion 11*b*. Furthermore, the large diameter cylindrical portion 11*c* corresponds to a radially opposing portion of the present invention. Also, the bending portion 11*b* and the large diameter cylindrical portion 11*c* of the housing 11 are collectively referred to as a housing-side engaging portion 11*y*. Thus, in the following description, the bending portion 11*b* and the large diameter cylindrical portion 11*c* may also be collectively referred to as the housing-side engaging portion 11*y*.

Next, after step S3 (the cover inserting step), the housing-side engaging portion 11*y* is heated (step S4 referred to as a heating step). Thereafter, the housing-side engaging portion 11*y* is swaged toward the cover 22, more specifically toward the cover-side engaging portion 223, so that the cover 22 is fixed to the housing 11 (step S5 referred to as the swaging step). In the following description, steps S4 (the heating step) and step S5 (the swaging step) will be described in detail.

Figure 1A:
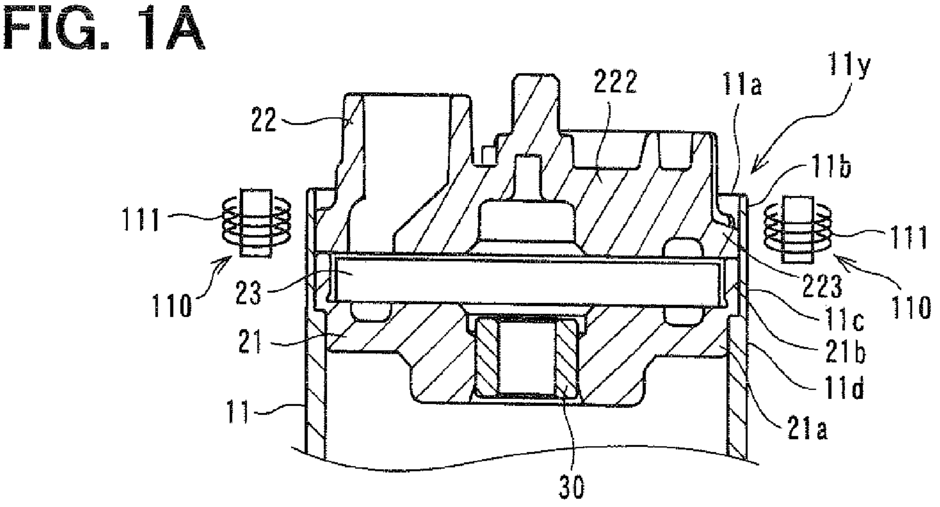
FIG. 1A is a schematic diagram showing a heating step of a fuel pump manufacturing method and a fuel pump manufacturing apparatus used therein according to a first embodiment of the present invention.

At step S4 (the heating step), as shown in FIG. 1A, electromagnetic induction heaters (sometimes referred to as an IH heaters) 110, each of which has an electromagnetic induction coil 111, are used to heat the housing-side engaging portion 11*y*. At radially outward of the housing 11, the electromagnetic induction heaters 110 are arranged one after another in the circumferential direction in such a manner that the electromagnetic induction heaters 110 are radially opposed to the housing-side engaging portion 11*y*.

Plating (e.g., zinc plating chromate treatment) is applied to a surface of the housing 11. A heating temperature of the electromagnetic induction heaters 110 for heating the housing-side engaging portion 11*y* is set to be a temperature (e.g., about 180 degrees Celsius) that is lower than a tolerable upper limit temperature (e.g., about 200 degrees Celsius) of the plating.

Figure 1B:
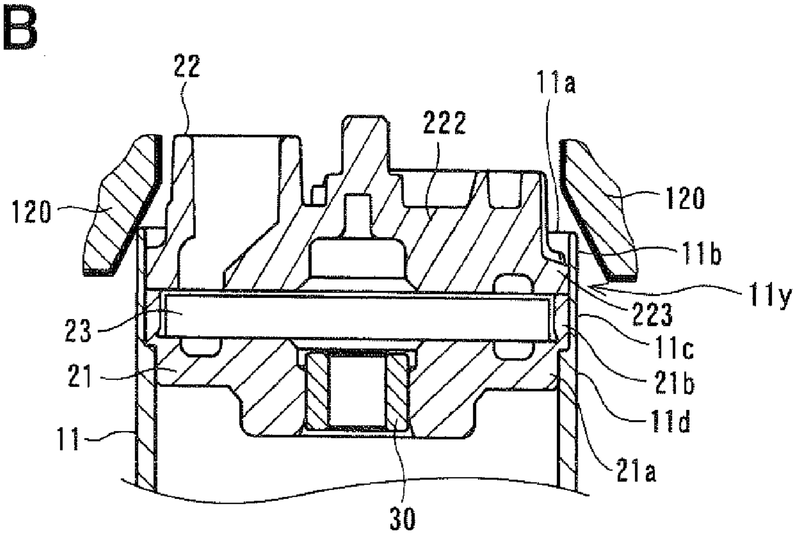
FIG. 1B is a schematic diagram showing beginning of a swaging step of the fuel pump manufacturing method.
Figure 1C:
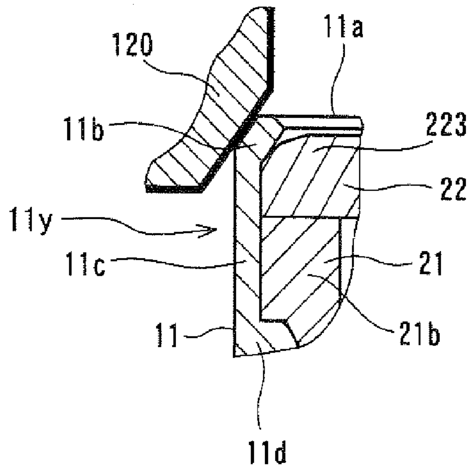
FIG. 1C is a schematic diagram showing ending of the swaging step of the fuel pump manufacturing method.

At step S5 (the swaging step), as shown in FIGS. 1B and 1C, a punch 120 is applied to the housing-side engaging portion 11*y* to press the same in the axial direction (the vertical direction in FIGS. 1B and 1C), so that the housing-side engaging portion 11*y* is swaged toward the cover-side engaging portion 223 of the cover 22. The punch 120 has a bowl form, which extends annularly in the circumferential direction and has a tapered inner surface that is opposed to and contacts the bending portion 11*b*.

Figure 5:
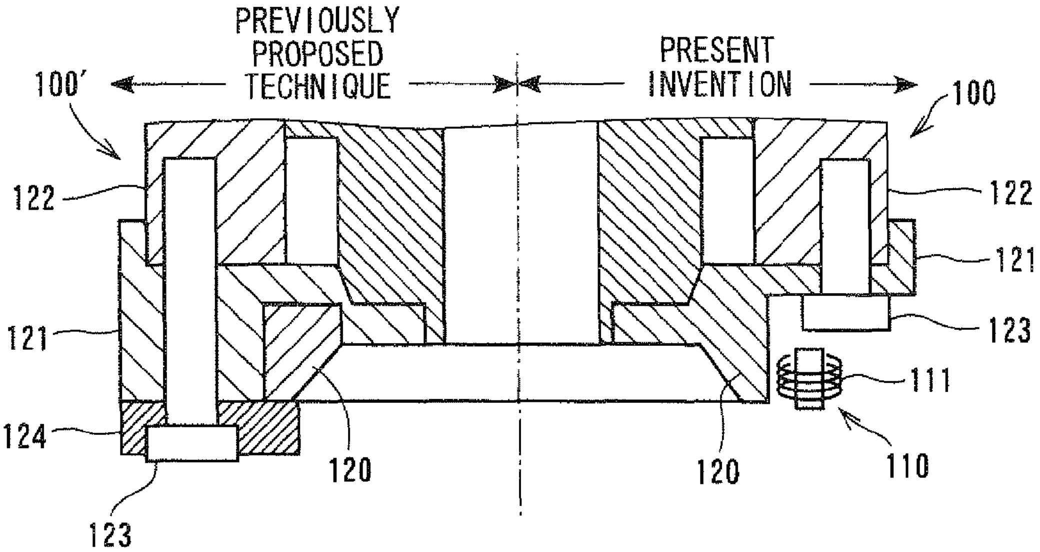
FIG. 5 is a cross sectional view showing a previously proposed fuel pump manufacturing apparatus on a left side of FIG. 5 and the fuel pump manufacturing apparatus of the first embodiment on a right side of FIG. 5.

A swaging apparatus 100 shown in FIG. 5 is used to perform the heating step (step S4) and the swaging step (step S5). The swaging apparatus 100 downwardly moves the punch 120 to the position shown in FIG. 1B and then further downwardly moves the punch 120 to the position shown in FIG. 1C to press the housing-side engaging portion 11*y*. At this time, the swaging apparatus 100 stops the downward movement of the punch 120 just before the bending portion 11*b*, which is pressed and is bent by the punch 120, contacts the cover-side engaging portion 223.

With reference to FIG. 5, a left half of FIG. 5 shows a previously proposed swaging apparatus 100', and a right half of FIG. 5 shows the swaging apparatus 100 of the present embodiment. Although the previously proposed swaging apparatus 100' has no electromagnetic induction heater, the swaging apparatus 100 of the present embodiment has the electromagnetic induction heaters 110. The electromagnetic induction heaters 100 are arranged radially outward of the punch 120.

In the previously proposed swaging apparatus 100', the punch 120 is formed separately from two holders 121, 124, which are fixed to a main body 122 with bolts 123, and the punch 120 is clamped between the holders 121/124. In contrast to this, in the swaging apparatus 100 of the present embodiment, the holder 124 is eliminated, and the holder 121 and the punch 120 are formed integrally. In this way, a space for accommodating the electromagnetic induction heaters 110 is created radially outward of the punch 120.

Figure 6:
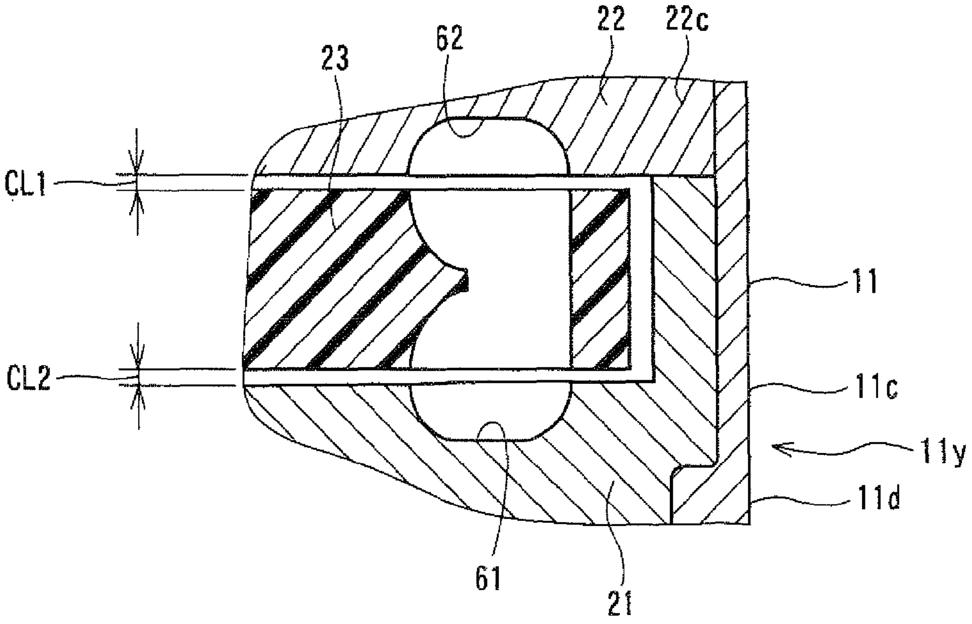
FIG. 6 is an enlarged partial view of FIG. 2 showing clearances around an impeller of the fuel pump.

FIG. 6 is an enlarged partial view of the pump arrangement after the completion of the swaging step (step S5). In FIG. 6, numeral CL1 indicates a clearance between the impeller 23 and the cover 22, and numeral CL2 indicates a clearance between the impeller 23 and the casing 21. In the swaging step (step S5), each of these clearances CL1, CL2 is controlled to fall into a predetermined value or predetermined range.

Thus, according to the present embodiment, the housing-side engaging portion 11*y* is heated before it is swaged toward the cover-side engaging portion 223. Then, the housing-side engaging portion 11*y*, which is heated and is swaged, is cooled to a room temperature and thereby is heat shrunk. When the bending portion 11*b* and the large diameter cylindrical portion 11*c* are heat shrunk, the bending portion 11*b* is urged against the top surface of the cover-side engaging portion 223, and the bending portion 11*b* and the large diameter cylindrical portion 11*c* radially inwardly bite into the cover-side engaging portion 223.

Thus, the axial force F1, which is exerted by the housing-side engaging portion 11*y*, can be advantageously increased without increasing the swaging load at the time of swaging the housing-side engaging portion 11*y*. In this way, undesirable deformation of the housing-side engaging portion 11*y* and of the cover 22, which would otherwise occur due to the application of the swaging load (the press load applied from the punch 120), can be avoided. Therefore, it is possible to increase the axial force F1 while liming the variations in the clearances CL1, CL2 around the impeller 23.

Figure 20:
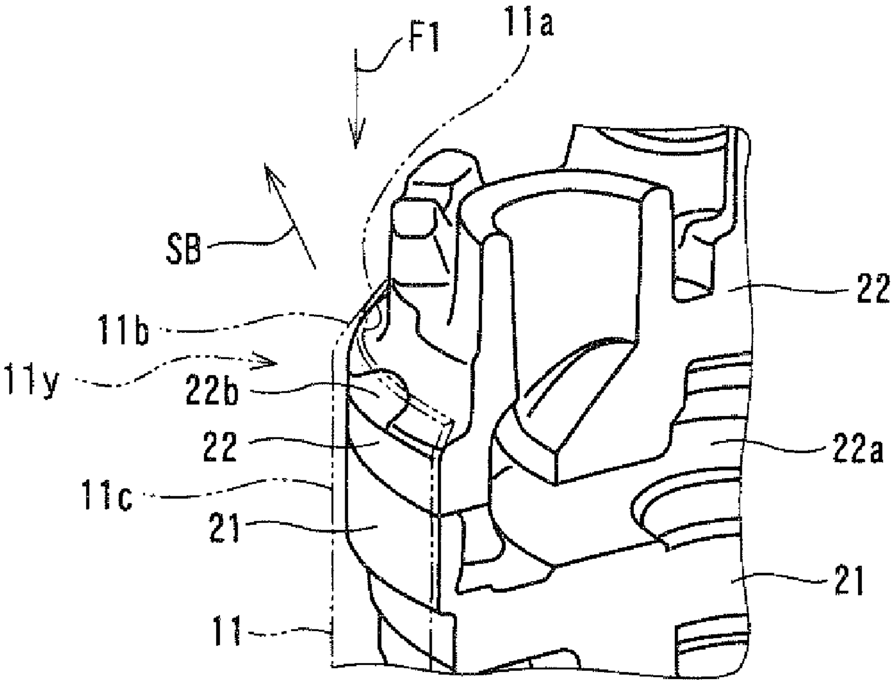
FIG. 20 PRIOR ART
FIG. 20 is a partial perspective view of a prior art fuel pump.

Furthermore, the housing-side engaging portion 11*y* is pressed against the cover-side engaging portion 223 by the heat shrink. Thus, the depressing step for depressing the housing-side engaging portion 11*y* against the recesses 22*b* of the cover 22 shown at FIG. 20 and step S7 of FIG. 4 can be eliminated while increasing the axial force F1. In this way, it is possible to avoid the concentration of the removal force (i.e., the force acting on the cover 22 to remove the cover 22 from the housing 11) on the portions of the housing 11 to deform the same. As a result, the axial force F1 can be increased while limiting the variations in the clearances CL1, CL2.

As discussed above, according to the present embodiment, while the sufficient axial force F1 is maintained by the housing-side engaging portion 11*y*, the high degree of precision of the clearances CL1, CL2 is maintained to limit the deterioration in the fuel flow characteristics of the fuel pump 10.

Furthermore, according to the present embodiment, the housing-side engaging portion 11*y* is heated by the electromagnetic induction heaters 110, so that the housing-side engaging portion 11*y* of the housing 11 can be locally heated. Therefore, it is possible to limit the unnecessary heat shrink of the rest of the housing 11 (e.g., the small diameter cylindrical portion 11*d*), which is other than the housing-side engaging portion 11*y*.

Furthermore, according to the present embodiment, the bending portion 11*b* and the large diameter cylindrical portion 11*c* are both heated as the housing-side engaging portion 11*y*. Thus, in comparison to a case where only the bending portion 11*b* or only the large diameter cylindrical portion 11*c* is heated, the amount of heat shrink of the housing-side engaging portion 11*y* (particularly, the amount of heat shrink of the housing-side engaging portion 11*y* in the axial direction) can be advantageously increased. Thereby, the axial force F1, which is achieved by the housing-side engaging portion 11*y*, can be increased.

Furthermore, according to the present embodiment, the iron-based metal is chosen as the material of the housing 11. The iron-based metal has the high electric resistance and thereby can be heated with the high heating efficiency by the electromagnetic induction heaters 110. In contrast, the aluminum is chosen as the material of the cover 22. The aluminum is the nonferrous metal, which has the low electric resistance and thereby cannot be heated effectively by the electromagnetic induction heaters 110, thereby showing the low heating efficiency. Therefore, when the housing 11 is heated to a predetermined temperature by the electromagnetic induction heaters 110, a degree of heating of the cover 22 by the electromagnetic induction heaters 110 is relatively low. Thus, while the amount of heat shrink of the housing-side engaging portion 11*y* is made relatively large, the amount of shrink of the cover 22 is made relatively small. Thereby, the axial force F1 can be further increased.

Also, according to the present embodiment, at the swaging step (step S5), the downward movement of the punch 120 is stopped immediately before occurrence of contacting of the bending portion 11*b* of the housing-side engaging portion 11*y* with the cover-side engaging portion 223. Thereafter, the housing-side engaging portion 11*y* is heat shrunk and is thereby pressed against the cover-side engaging portion 223. In this way, the housing-side engaging portion 11*y* is securely engaged with the cover-side engaging portion 223.

Therefore, application of the swaging load to the cover 22 can be more effectively limited to more effectively limit the deformation of the cover 22 caused by the swaging load in comparison to a case where the punch 120 is moved further downward even after the occurrence of contacting of the bending portion 11*b* with the cover-side engaging portion 223. In this way, the variations in the clearances CL1, CL2 can be further limited.

In the present embodiment, the heating temperature of the housing-side engaging portion 11*y* is set to about 180 degrees Celsius, which can ensure the achievement of the sufficient axial force F1. The reason for setting the heating temperature to about 180 degrees Celsius will now be described with reference to FIG. 7.

According to a result of a test, which was performed on the fuel pump 10 of the present embodiment, when a swaging load of 12 kN is applied to the bending portion 11*b* to axially press the bending portion 11*b* in an amount of about 37 μm, the amount of spring back is about 19 μm. Therefore, when the above heating temperature is set to make the amount of heat shrink of the housing-side engaging portion 11*y* in the axial direction about 19 μm, it is possible to limit the reduction in the axial force F1 caused by the spring back.

Figure 7:
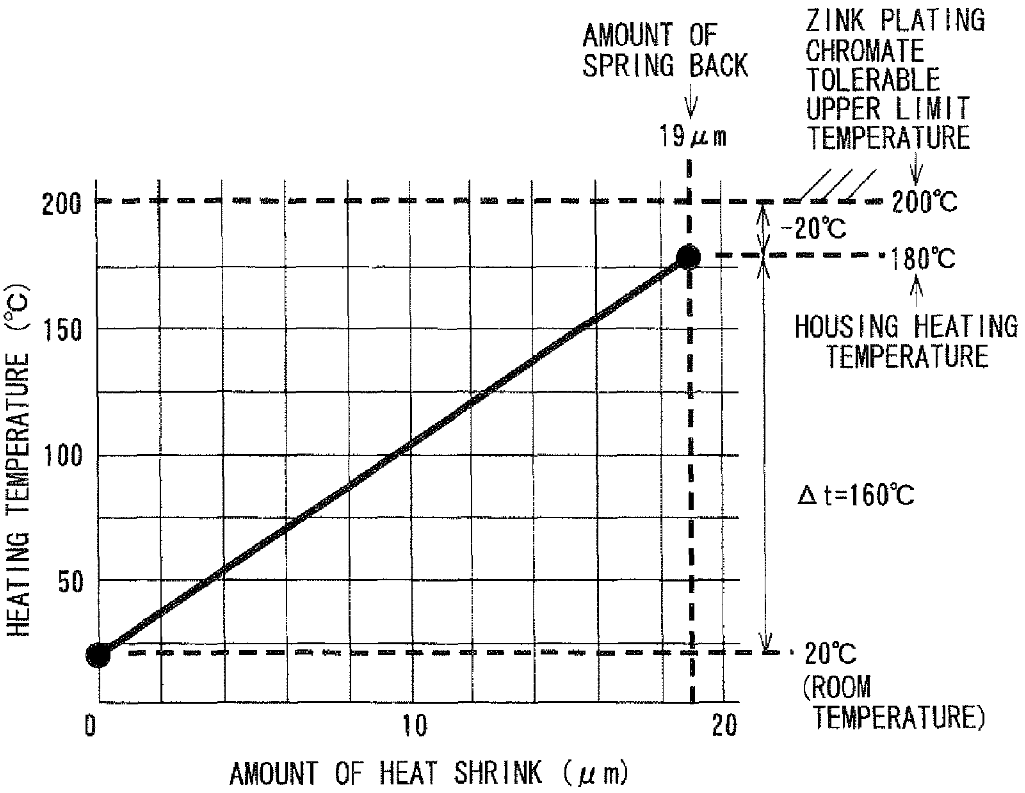
FIG. 7 is a diagram showing a relationship between an amount of heat shrink of a housing-side engaging portion and a heating temperature.

With reference to FIG. 7, it is now assumed that the amount of heat shrink of the housing-side engaging portion 11*y* is zero under the room temperature of 20 degrees Celsius, and the temperature of the heated housing-side engaging portion 11*y*, which is heated by the electromagnetic induction heater 110, is 180 degrees Celsius. In such a case, the temperature of the housing-side engaging portion 11*y* is dropped by 160 degrees Celsius from the heating temperature of 180 degrees Celsius to the room temperature of 20 degrees Celsius. A coefficient of linear expansion of iron is $11.7\times10^{-6}$/degrees Celsius, and the housing-side engaging portion 11*y* has an axial length L of 10 mm. Therefore, the amount of heat shrink is calculated as $160\times11.7\times10^{-6}\times10=18.7$ μm. Therefore, when the heating temperature is set to 180 degrees Celsius, the amount of heat shrink (18.7 μm) of the housing-side engaging portion 11*y* becomes generally the same as the amount of spring back (19 μm). Therefore, it is possible to limit the reduction of the axial force F1 caused by the spring back.

Figure 8:
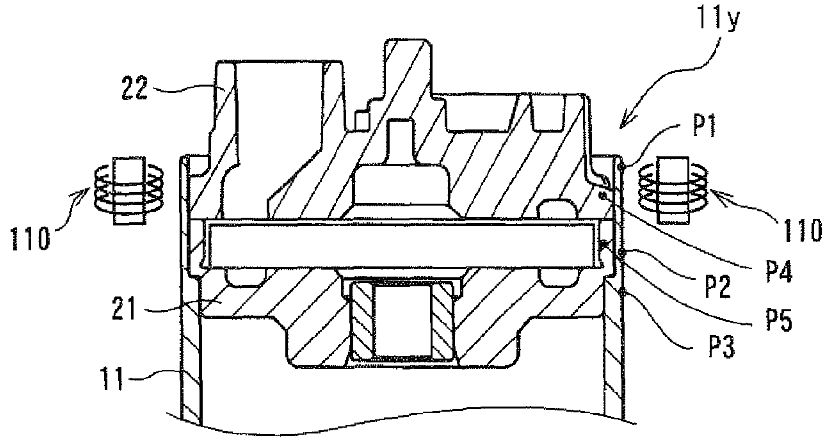
FIG. 8 is a cross sectional view showing temperature measurement points in the fuel pump in an experiment for measuring a change in the temperature of the fuel pump.
Figure 9:
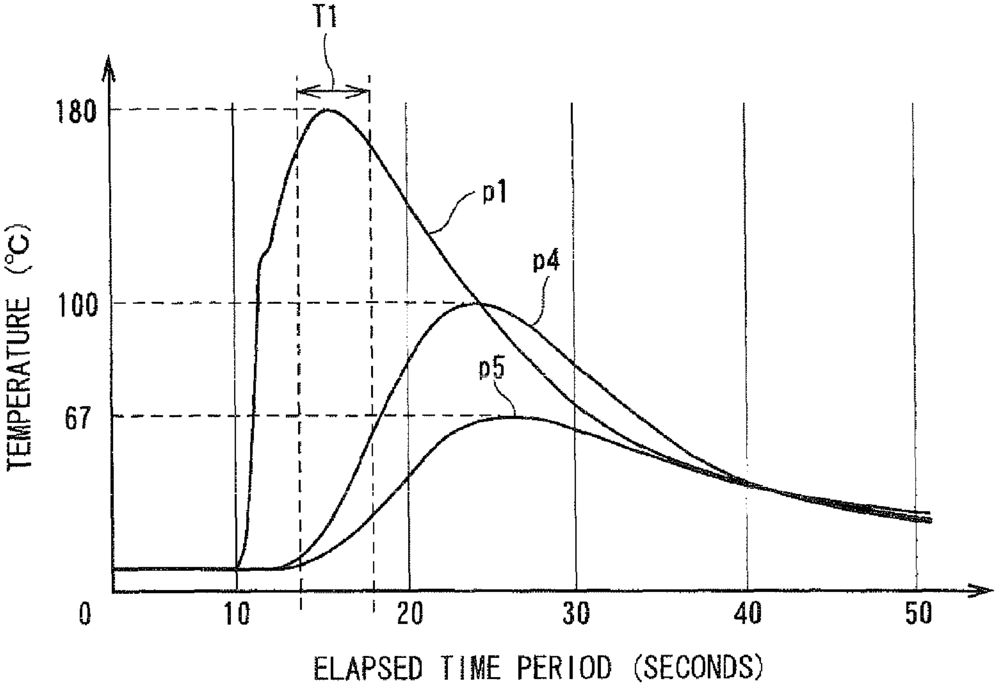
FIG. 9 is a diagram showing a result of the experiment for measuring the temperature at the measurement points shown in FIG. 8.

As shown in FIG. 8, the electromagnetic induction heaters 110 are placed adjacent to a point P1 of the housing 11, i.e., adjacent to the housing-side engaging portion 11*y* and are energized to start the heating. FIG. 9 shows a result of the experiment, in which a change in the heating temperature is shown in relation to an elapsed time period since the time of starting the heating. A curved line p1 indicated in FIG. 9 shows a change in the temperature at the point P1 of the hosing 11 shown in FIG. 8 and is increased to 180 degrees Celsius. A curved line p4 indicated in FIG. 9 shows a change in the temperature at a point P4 of the cover 22 shown in FIG.

8 and is increased to 100 degrees Celsius. A curved line p5 indicated in FIG. 9 shows a change in the temperature at a point P5 of the casing 21 shown in FIG. 8 and is increased to 67 degrees Celsius.

Based on this experiment, it is found that each of the temperature of the point P4 of the cover 22 and the temperature of the point P5 of the casing 21 reach its peak temperature after about 10 seconds from the time of reaching the peak temperature at the point P1.

Therefore, when the swaging step (step S5) is performed within a time period T1, which is shown in FIG. 9 and is measured since the time of locally heating the housing-side engaging portion 11*y* of the housing 11, the heating and swaging can be performed by utilizing the heat shrink phenomenon described above before reaching of the peak temperature of the cover-side engaging portion 223 of the cover 22 and the peak temperature of the cylindrical receiving portion 21*b* of the casing 21. Therefore, it is possible to reduce or limit undesirable deformation of the pump arrangement 20 caused by unnecessary heat shrink.

Figure 10:
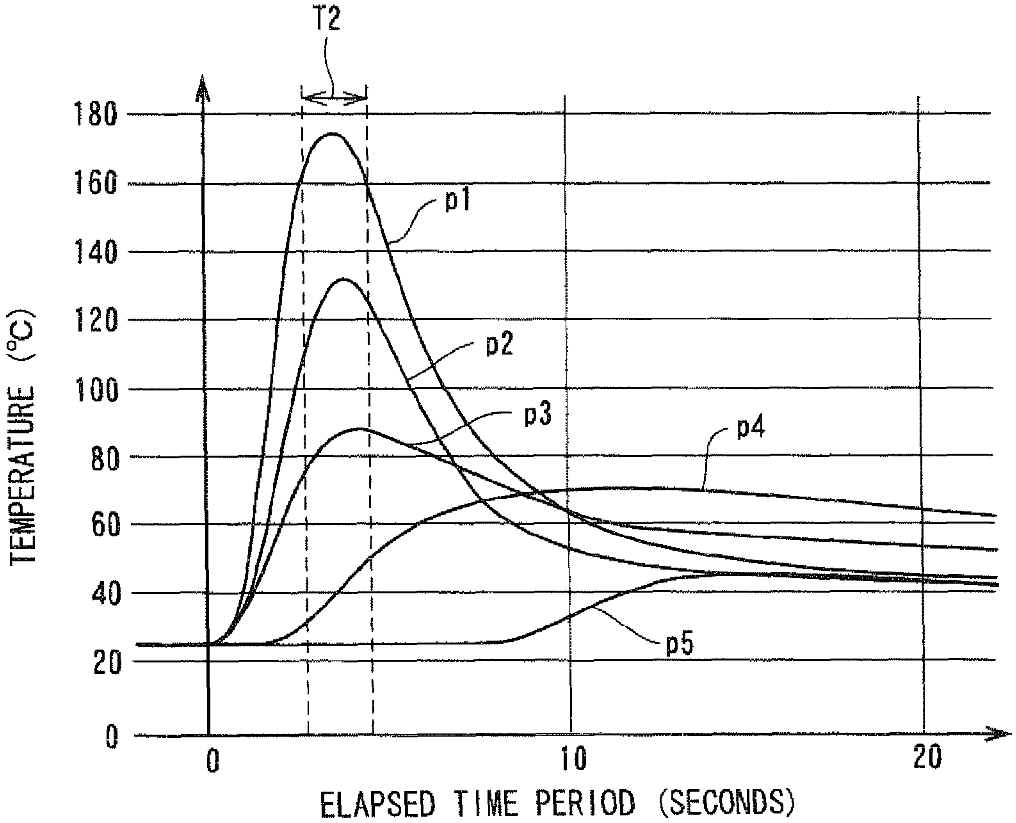
FIG. 10 is a diagram showing a result of another experiment for measuring the temperature at the measurement points shown in FIG. 8.

FIG. 10 shows a result of another experiment, in which a change in the heating temperature is shown in relation to an elapsed time period since the time of starting the heating. In this experiment, similar to the above experiment, the electromagnetic induction heaters 110 shown in FIG. 8 are placed adjacent to the point P1 of the housing 11 and are energized to start the heating. A curved line p1, a curved line P2 and a curved line p3 of FIG. 10 show a temperature change at the point P1, the point P2 and the point P3, respectively, of the housing 11 shown in FIG. 8. Furthermore, a curved line p4 and a curved line p5 indicate a temperature change at the point P4 of the cover 22 and a temperature change at the point P5 of the casing 21.

As shown in FIG. 10, each of the temperatures of the points P1 to P3 of the housing 11 reaches its peak within a time period T2. Furthermore, each of the temperature of the point P4 of the cover 22 and the temperature of the point P5 of the casing 21 reaches its own peak after each of the temperatures of the points P1 to P3 of the housing 11 reaches its peak.

Therefore, based on the result of this experiment too, when the swaging step (step S5) is performed within the time period T2 shown in FIG. 10 upon locally heating the housing-side engaging portion 11*y* of the housing 11, the heating and swaging can be performed by utilizing the heat shrink phenomenon described above before reaching of the peak temperature of the cover-side engaging portion 223 of the cover 22 and the peak temperature of the cylindrical receiving portion 21*b* of the casing 21.

Now, other embodiments of the present invention will be described below. In the following embodiments, the components similar to those of the first embodiment will be indicated by the same reference numerals as those of the above embodiment and therefore will not be described further.

Second Embodiment

Figure 11A:
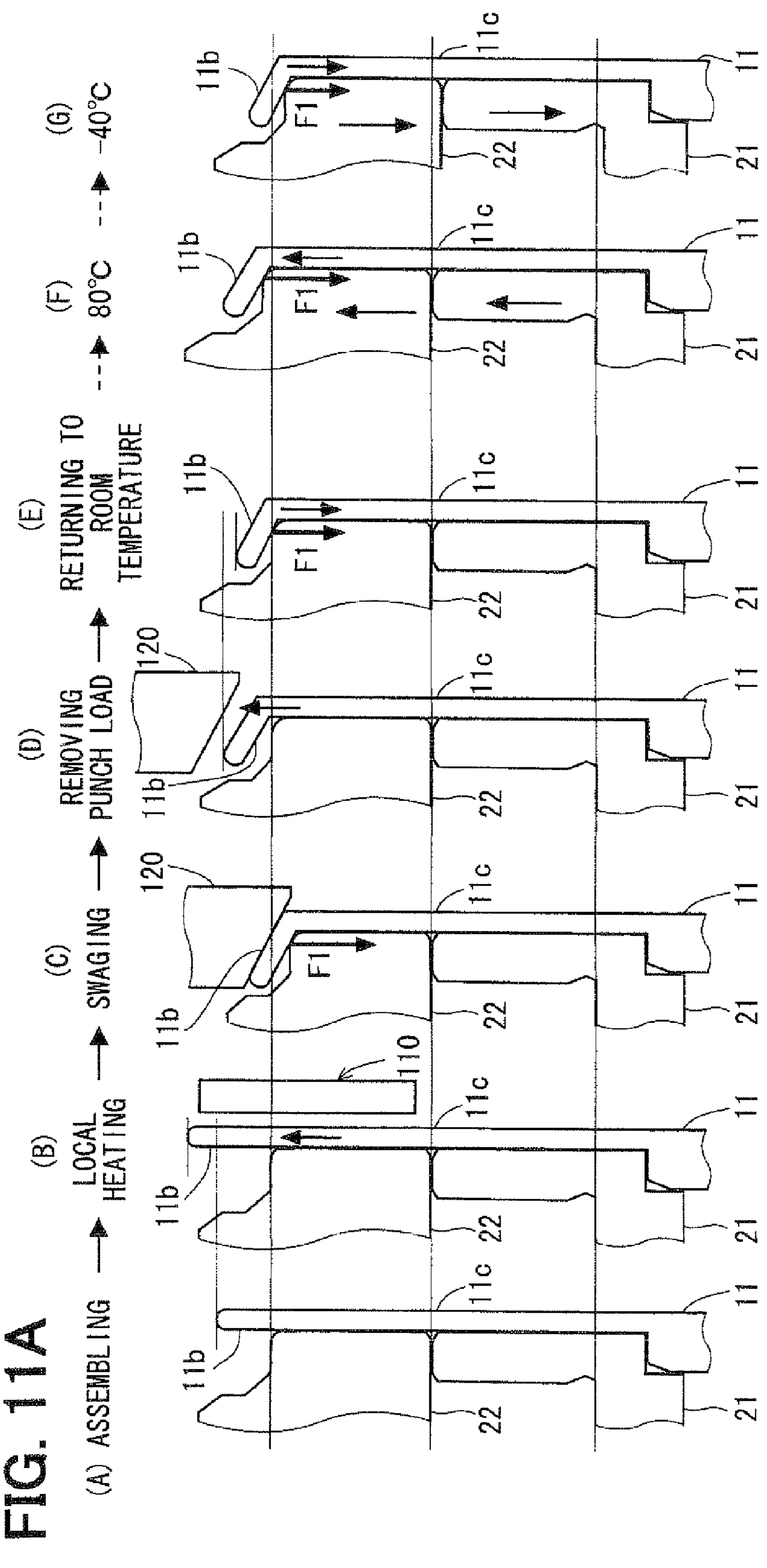
FIG. 11A is a diagram showing respective steps of the fuel pump manufacturing method and respective environmental temperatures along with the axial force according to a second embodiment.
Figure 11B:
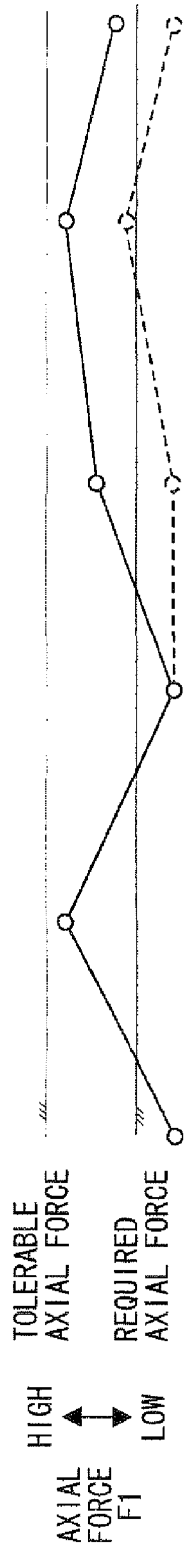
FIG. 11B is a diagram showing a change in the axial force in view of FIG. 11A.

In a second embodiment of the present invention, after the bending portion 11*b* contacts the cover-side engaging portion 223, the punch 120 is moved downward until the bending portion 11*b* is pressed with a predetermined urging force in a resiliently deformable range. FIGS. 11A and 11B show a change in the axial force F1 in the manufacturing of the fuel pump and a change in the axial force F1 upon occurrence of a change in the environmental temperature.

Now, the change in the axial force F1 in the manufacturing of the fuel pump will be described.

First, during an assembling step shown in a section (A) in FIG. 11A, the casing 21 and the cover 22 are installed into the housing 11. Next, during a heating step shown in a section (B) in FIG. 11A, the housing-side engaging portion 11*y* of the housing 11 and therearound are temporarily heated by the electromagnetic induction heaters 110. In this way, the housing-side engaging portion 11*y* is elongated in the axial direction of the housing 11. At this moment, the axial force F1 is not generated. When the housing-side engaging portion 11*y* is locally heated and thereby reaches its peak temperature, the punch 120 is moved downward in a swaging step shown in a section (c) in FIG. 11A to press the bending portion 11*b*. In the present embodiment, after the bending portion 11*b* is bent by the punch 120 and thereby contacts the cover 22, the punch 120 is further moved downward. In this way, the bending portion 11*b* is pressed with the predetermined pressure in the resiliently deformable range. Thereby, the axial force F1, i.e., the axial force, which acts from the bending portion 11*b* to the cover 22 in the axial direction, is generated. As shown in the graph of FIG. 11B, the axial force F1 is within a tolerable axial force range.

As shown in a section (D) in FIG. 11A, when the punch 120 is moved upward to remove the load applied from the punch 120 onto the bending portion 11*b*, spring back occurs in the housing-side engaging portion 11*y*. At this time, the bending portion 11*b* is axially spaced from the cover 22, so that the axial force F1 is not generated.

Then, when the axially elongated housing-side engaging portion 11*y* of the housing 11, which was temporarily heated, is cooled to the room temperature, the housing-side engaging portion 11*y* is heat shrunk in the axial direction, as shown in a section (E) in FIG. 11A. In this way, the bending portion 11*b* contacts the cover 22 and urges the cover 22 toward the casing 21 side. Therefore, the axial force F1 is generated by the bending portion 11*b*. At this time, as shown in FIG. 11B (see a section of FIG. 11B immediately below the section (E) of FIG. 11A), the axial force F1 under the room temperature is larger than the required axial force of the bending portion 11*b*, which is required to hold the casing 21 and the cover 22 in the interior of the housing 11, and is within the tolerable axial force range.

Next, the change in the axial force F1 upon occurrence of the change in the environmental temperature will be described in detail.

As shown in a section (F) in FIG. 11A, when the environmental temperature is changed from the room temperature to the high temperature (e.g., 80 degrees Celsius), the housing 11, the cover 22 and the casing 21 are expanded in the axial direction due to the thermal expansion. In the present embodiment, the housing 11 is made of the iron-based metal, and the cover 22 and the casing 21 are made of aluminum. A coefficient of thermal expansion of the aluminum is larger than that of the iron-based metal. Thus, the degree of expansion of the cover 22 and the degree of expansion of the casing 21 should be larger than the degree of expansion of the housing 11. Therefore, the cover 22 urges the bending portion 11*b* of the housing 11 in the greater degree in comparison to the room temperature. As a result, the axial force, which is applied from the bending portion 11*b* to the cover 22, i.e., the axial force F1 becomes larger than the axial force F1 under the room temperature. At this time, as shown in FIG. 11B (see a section of FIG. 11B immediately below the section (F) of FIG. 11A), the axial force F1 under the high temperature (e.g., 80 degrees Celsius) is also larger than the required axial force of the bending portion 11*b*, which is required to hold the casing 21 and the cover 22 in the interior of the housing 11, and is within the tolerable axial force range.

As shown in a section (G) in FIG. 11A, when the environmental temperature is changed from the room temperature or the high temperature to the low temperature (e.g., –40 degrees Celsius), the housing 11, the cover 22 and the casing 21 are shrunk, i.e., are contracted in the axial direction of the housing 11. The degree of shrinkage of the aluminum cover 22 and the degree of shrinkage of the aluminum casing 21 are larger than the degree of shrinkage of the iron-based metal housing 11. Thus, although the axial force F1 under the low temperature becomes smaller than the axial force F1 under the room temperature or under the high temperature, the required axial force is maintained even under the low temperature.

For the comparative purpose, a dotted line in FIG. 11B indicates a change in the axial force F1 in the previously proposed fuel pump, which is formed by the previously proposed manufacturing method, in which the swaging is performed without the heating. This graph, which is indicated by the dotted line, reveals that the required axial force can be achieved under the high temperature (e.g., 80 degrees Celsius) but cannot be achieved under the normal temperature or the low temperature (e.g., –40 degrees Celsius) in the case of the fuel pump formed by the previously proposed manufacturing method, in which the swaging is performed without the heating.

Third Embodiment

Figure 13:
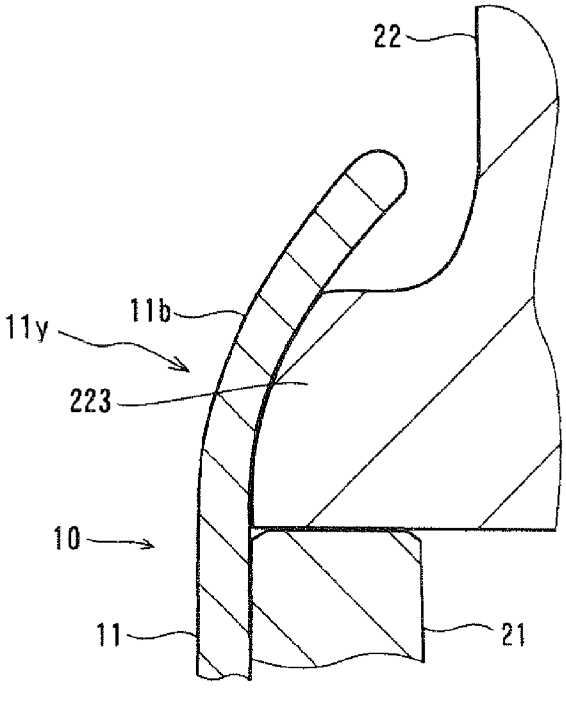
FIG. 13 is a partial cross sectional view of the fuel pump formed through a manufacturing method according to a third embodiment.

FIG. 13 shows a partial cross sectional view of a fuel pump manufactured according to a third embodiment of the present invention. The bending portion 11*b* of the housing 11 shown in FIG. 13 is a modification of the bending portion 11*b* of the fuel pump, which is formed by the manufacturing method of the first embodiment.

Figure 12:
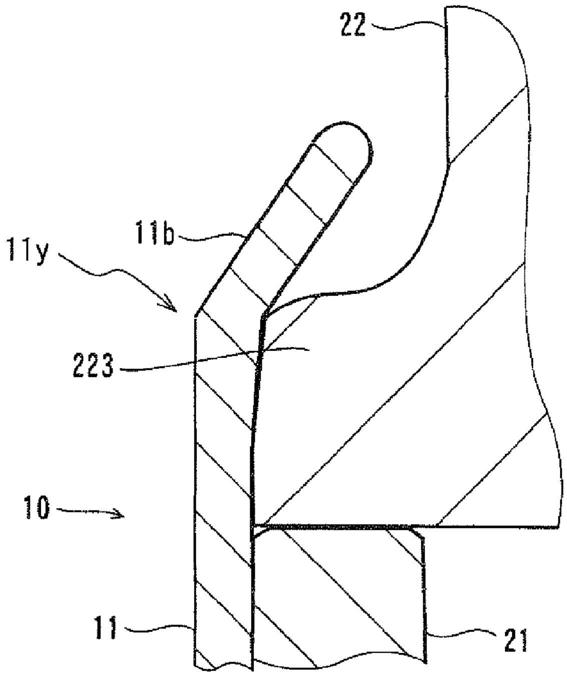
FIG. 12 is a partial cross sectional view of the fuel pump formed through the manufacturing method of the first embodiment.

As shown in FIG. 12, the bending portion 11*b* of the fuel pump, which is formed by the manufacturing method of the first embodiment, has a linear cross section in a plane parallel to the axis of the housing 11. In contrast, the bending portion 11*b* of the housing 11 shown in FIG. 13 has a curved cross section in the plane parallel to the axis of the housing 11. When the shape of the bending portion 11*b* is adapted to conform with the shape of the cover-side engaging portion 223 of the cover 22, the removal of the cover 22 from the housing 11 can be further limited.

Fourth Embodiment

FIGS. 14 to 17 are partial cross sectional views of various types of fuel pump manufacturing apparatuses and the various types of housings 11 of the fuel pumps, which are formed through use of the various types of fuel pump manufacturing apparatuses, respectively, according to a fourth embodiment. The bending portions 11*b* of the housings 11 shown in FIGS. 14 to 17 are further modifications of the bending portion 11*b* of the fuel pump, which is formed according to the first embodiment.

Figure 14:
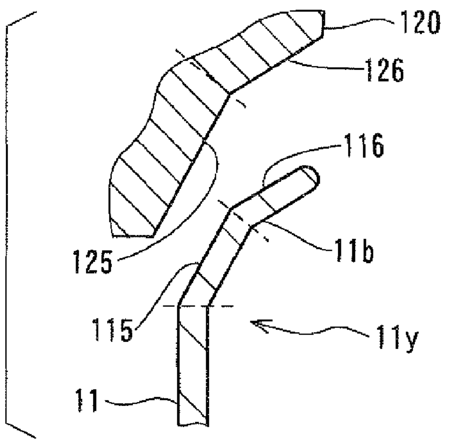
FIG. 14 is a partial cross sectional view showing a modification of the fuel pump manufacturing apparatus and the fuel pump formed therewith according to the first embodiment.

The bending portions 11*b* of the housings 11 shown in FIGS. 14 to 17 are bent in a stepwise manner. For example, the punch 120 shown in FIG. 14 includes a wall surface 125 and a wall surface 126, which contact the bending portion 11*b* of the housing 11 at the time of performing the swaging step. In a cross section of the punch 120 in the plane parallel to the axis of the housing 11, the wall surface 125 and the wall surface 126 extend linearly and are tilted at predetermined angles, respectively. Specifically, the punch 120 of FIG. 14 has a bowl form, which extends annularly in the circumferential direction and has the tapered surfaces 125, 126 of different angles that are opposed to and contact with the bending portion 11*b*. In the swaging step, when the punch 120 shown in FIG. 14 is pressed against the bending portion 11*b*, two tapered surfaces, which are angled to correspond with the tapered wall surfaces 125, 126, respectively, are formed in the bending portion 11*b*. Specifically, a wall surface 115 and a wall surface 116, which respectively form the above two tapered wall surfaces of the bending portion 11*b*, have linear cross sections, respectively, in the plane parallel to the axis of the housing 11. These linear cross sections of the wall surface 115 and of the wall surface 116 are tilted at predetermined angles, respectively, with respect to the axis of the housing 11. In FIG. 14, a dotted line in the cross section of the punch 120 indicates a boundary between the wall surface 125 and the wall surface 126 of the punch 120, and an upper dotted line in the cross section of the bending portion 11*b* indicates a boundary between the wall surface 115 and the wall surface 116. Furthermore, a lower dotted line in the cross section of the bending portion 11*b* indicates a boundary between the bending portion 11*b* and the large diameter cylindrical portion 11*c* (see FIG. 1A).

Figure 15:
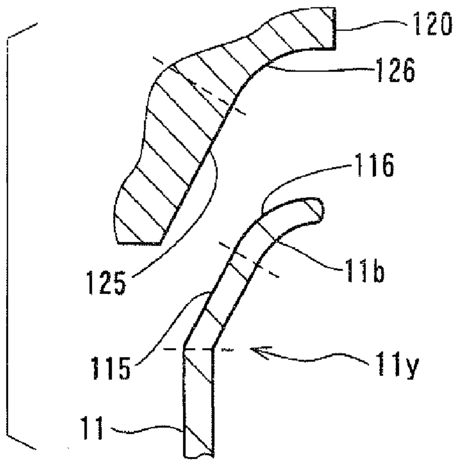
FIG. 15 is a partial cross sectional view showing another modification of the fuel pump manufacturing apparatus and the fuel pump formed therewith according to the first embodiment.

In the case of the punch 120 shown in FIG. 15, a cross section of the wall surface 125 in the plane parallel to the axis of the housing 11 is linear, and a cross section of the wall surface 126 in the plane parallel to the axis of the housing 11 is curved. When the punch 120 shown in FIG. 15 is pressed against the bending portion 11*b*, the wall surface 115 of the bending portion 11*b* shows the linear cross section in the plane parallel to the axis of the housing 11, and the wall surface 116 of the bending portion 11*b* shows the curved cross section in the plane parallel to the axis of the housing 11.

Figure 16:
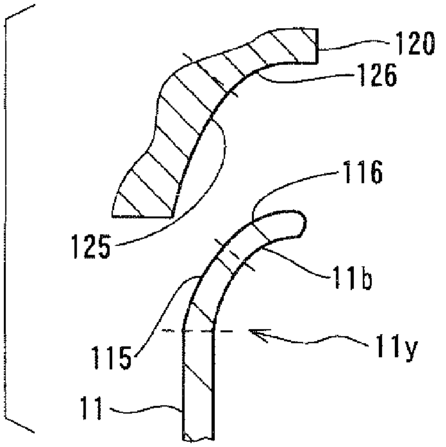
FIG. 16 is a partial cross sectional view showing a further modification of the fuel pump manufacturing apparatus and the fuel pump formed therewith according to the first embodiment.

In the case of the punch 120 shown in FIG. 16, a cross section of the wall surface 125 in the plane parallel to the axis of the housing 11 is curved, and a cross section of the wall surface 126 in the plane parallel to the axis of the housing 11 is also curved. Thus, when the punch 120 shown in FIG. 16 is pressed against the bending portion 11*b*, the wall surface 115 of the bending portion 11*b* shows the curved cross section in the plane parallel to the axis of the housing 11, and the wall surface 116 of the bending portion 11*b* shows the curved cross section in the plane parallel to the axis of the housing 11.

Figure 17:
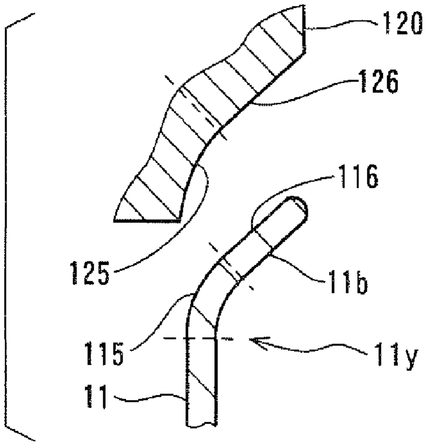
FIG. 17 is a partial cross sectional view showing a further modification of the fuel pump manufacturing apparatus and the fuel pump formed therewith according to the first embodiment.

In the case of the punch 120 shown in FIG. 17, a cross section of the wall surface 125 in the plane parallel to the axis of the housing 11 is curved, and a cross section of the wall surface 126 in the plane parallel to the axis of the housing 11 is linear. Thus, when the punch 120 shown in FIG. 17 is pressed against the bending portion 11*b*, the wall surface 115 of the bending portion 11*b* shows the curved cross section in the plane parallel to the axis of the housing 11, and the wall surface 116 of the bending portion 11*b* shows the linear cross section in the plane parallel to the axis of the housing 11.

As described above, in the modifications of the bending portion 11*b* of the housing 11 shown in FIGS. 14 to 17, the wall surface 115 and the wall surface 116 of the bending portion 11*b* have one of the combination of the linear cross section and the linear cross section, the combination of the curved cross section and the curved cross section and the combination of the linear cross section and the curved cross section. As described above, when the wall surfaces of the bending portion 11*b* are tapered in the stepwise manner, the shape of the bending portion 11*b* can be adapted to the shape of the cover-side engaging portion 223 of the cover 22, and the amount of spring back in the bending portion 11*b* of the housing 11 can be reduced.

Fifth Embodiment

Figure 18:
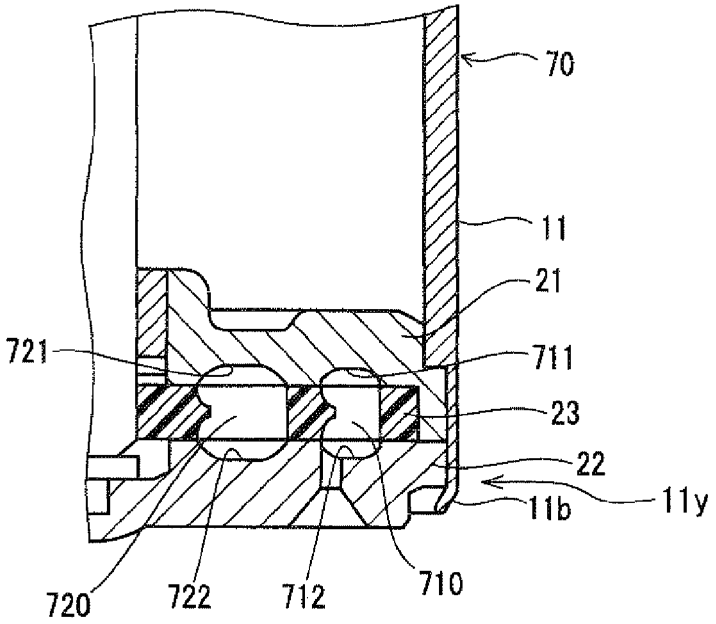
FIG. 18 is a partial cross sectional view of the fuel pump formed through a manufacturing method according to a fifth embodiment.

FIG. 18 shows a partial cross sectional view of a fuel pump manufactured according to a fifth embodiment of the present invention. The fuel pump 70 includes the housing 11, the casing 21, the cover 22 and the impeller 23. A groove 711 and a groove 721 are formed in the casing 21, and a groove 712 and a groove 722 are formed in the cover 22. A flow passage 710, which conducts fuel, is defined by the groove 711, the groove 712 and the impeller 23. Also, a flow passage 720, which conducts fuel is defined by the groove 721, the groove 722 and the impeller 23. The bending portion 11*b* of the housing 11 is bent radially inward of the housing 11 by the heating and swaging like in the first embodiment to hold the casing 21, the cover 22 and the impeller 23 in the interior of the housing 11. As described above, in the fuel pump 70, the grooves 711, 721 are formed in the casing 21, and the grooves 712, 722 are formed in the cover 22. Thus, the structural strength of the casing 21 and the structural strength of the cover 22 are relatively low. Thereby, when an excess force is applied to the casing 21 and the cover 22, the casing 21 and the cover 22 may possibly be deformed. When the heating and swaging of the present invention is applied to such a fuel pump 70, it is possible to limit application of the excess load to the casing 21 and the cover 22 at the time of swaging, and thereby it is possible to reduce deformation of the casing 21 and the cover 22 caused by the excess load.

Sixth Embodiment

Figure 19:
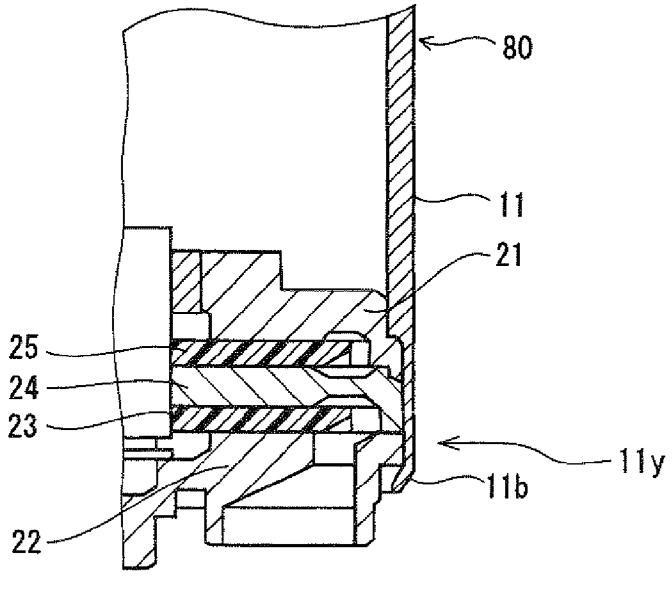
FIG. 19 is a partial cross sectional view of the fuel pump formed through a manufacturing method according to a sixth embodiment.

FIG. 19 shows a partial cross sectional view of a fuel pump manufactured according to a sixth embodiment of the present invention. The fuel pump 80 includes the housing 11, the casing 21, the cover 22, the impeller 23, a casing 24, and the impeller 25. The bending portion 11*b* of the housing 11 is bent radially inward of the housing 11 by the heating and swaging like in the first embodiment to hold the casing 21, the cover 22, the impeller 23 and the casing 24 in the interior of the housing 11. The casing 21 and the casing 24 hold the impeller 25 therebetween, and the casing 24 and the cover 22 hold the impeller 23 therebetween. As described above, each of the casing 21, the casing 24 and the cover 22 is formed to have a relatively small plate thickness to hold the corresponding impeller 23, 25 in corporation with the other corresponding one of the casing 21, the casing 24 and the cover 22. Thus, the structural strength of the casing 21, the structural strength of the casing 24 and the structural strength of the cover 22 are relatively low. Thereby, when an excess force is applied to the casing 21, the casing 24 and the cover 22, it may cause deformation of the casing 21, the casing 24 and the cover 22. When the heating and swaging of the present invention is applied to such a fuel pump 80, it is possible to limit application of the excess load to the casing 21, the casing 24 and the cover 22 at the time of swaging, and thereby it is possible to reduce deformation of the casing 21, the casing 24 and the cover 22 caused by the excess load.

Other Embodiments

According to the present invention, it is required to perform the heating step (step S4) before the swaging step (step S5), but the operational sequence the other steps S1-S3 is not limited to the above described one. For example, at least one of steps S1-S3 may be performed after the heating step (step S4). However, when the time period between the time of heating and the time of swaging is made relatively short, the heating temperature may be made relatively low. Therefore, in view of this point, it is desirable to perform the above steps in the above described order of the above embodiments.

Furthermore, in each of the above embodiments, the electromagnetic induction heaters 110 are used as the heating means, and due to the heating efficiency of the iron-based metal, the housing 11 is made of the iron-based metal. However, the heating means of the present invention is not limited to this. For example, alternatively, hot-plate heating, laser heating, ultrasonic vibrational heating, high-frequency heating or microwave heating may be used.

Thus, the material of the housing 11 is not limited to the iron-based metal and may be nonferrous metal, such as stainless steel, aluminum. Furthermore, the material of the casing 21 and the material of the cover 22 are not limited to the nonferrous metal, such as aluminum, and may be alternatively iron-based metal, stainless steel or resin.

As discussed above, the present invention is not limited to the above embodiments and can be embodied in various ways without departing the spirit and scope of the invention. For example, the characteristic features of the above embodiment as well as the modifications may be combined in any combination.

What is claimed is:

1. A method for manufacturing a fuel pump, which includes a tubular, metal housing that has an opening; an impeller that is received in the housing; and a cover that covers the opening of the housing and is placed on one axial side of the impeller where the opening of the tubular housing is located, the method comprising:

inserting the cover, which is made of aluminum, into the housing, which is made of iron-based aluminum, to place the cover radially inward of the housing;

after the inserting of the cover into the housing, heating a housing-side engaging portion of the housing, which is located at a peripheral edge of the opening of the housing, with at least one electromagnetic induction heater, each of which is placed radially outward of the housing and has an electromagnetic coil; and swaging the heated housing-side engaging portion toward the cover by applying a mechanical force against the housing-side engaging portion to fix the cover to the housing, wherein the heating of the housing-side engaging portion includes heating both (a) a bending portion of the housing, which is bent in the swaging of the housing-side engaging portion, and (b) a radially opposing portion of the housing, which is located adjacent to the bending portion and is radially opposed to the cover, as the housing-side engaging portion, and the swaging of the housing-side engaging portion includes:

axially moving a punch to press the punch against the heated housing-side engaging portion to thereby bend a portion of the housing-side engaging portion;

stopping the pressing of the punch against the heated housing-side engaging portion; and cooling the heated housing-side engaging portion to induce heat shrink of the housing-side engaging portion, said heat shrink axially urging and securely engaging the housing-side engaging portion against the cover.

2. The method according to claim 1, wherein the stopping of the pressing of the punch includes stopping the pressing of the punch immediately before occurrence of contacting of the bent portion of the heated housing-side engaging portion with the cover.

3. The method according to claim 1, wherein the swaging of the housing-side engaging portion is executed only after the heating of the housing-side engaging portion of the housing.

4. The method according to claim 1, wherein the heating of the housing-side engaging portion of the housing includes heating the housing-side engaging portion of the housing at a temperature, which is lower than 200 degrees Celsius.

5. The method according to claim 1, wherein the cooling of the heated housing-side engaging portion includes cooling the heated housing-side engaging portion to induce the heat shrink of the housing-side engaging portion against the cover, so that the cover is axially clamped between the housing-side engaging portion of the housing and another portion of the housing.

6. The method according to claim 1, wherein the heating of the housing-side engaging portion of the housing includes heating the housing-side engaging portion of the housing to a temperature which is lower than a tolerable upper limit temperature of plating which is formed on a surface of the housing.

* * * * *